United States Patent
Knitt et al.

(10) Patent No.: US 9,331,500 B2
(45) Date of Patent: May 3, 2016

(54) METHOD FOR BALANCING ULTRACAPACITOR CELLS

(75) Inventors: Andrew A. Knitt, Deer Creek, IL (US); Wellington Ying-Wei Kwok, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 1050 days.

(21) Appl. No.: 13/450,890

(22) Filed: Apr. 19, 2012

(65) Prior Publication Data

US 2013/0278227 A1    Oct. 24, 2013

(51) Int. Cl.
*H02J 7/00* (2006.01)
*H02J 7/34* (2006.01)

(52) U.S. Cl.
CPC .............. *H02J 7/0016* (2013.01); *H02J 7/345* (2013.01)

(58) Field of Classification Search
CPC ...................................... H02J 7/0016
USPC .................................. 320/167, 166
See application file for complete search history.

(56) References Cited

U.S. PATENT DOCUMENTS

| | | |
|---|---|---|
| 6,316,917 B1 * | 11/2001 | Ohta ............... H02J 7/0016 320/166 |
| 6,788,027 B2 | 9/2004 | Malik |
| 7,439,631 B2 | 10/2008 | Endou |
| 7,692,411 B2 | 4/2010 | Trainor et al. |
| 7,888,945 B2 | 2/2011 | Miyazaki et al. |
| 2004/0263121 A1 | 12/2004 | Thrap |
| 2010/0039072 A1 | 2/2010 | Cegnar et al. |
| 2010/0138064 A1 | 6/2010 | Wilk et al. |
| 2010/0258369 A1 | 10/2010 | Ranier et al. |
| 2010/0283434 A1 | 11/2010 | Kakiuchi |
| 2011/0001353 A1 | 1/2011 | Emerson et al. |

* cited by examiner

*Primary Examiner* — Richard V Muralidar
(74) *Attorney, Agent, or Firm* — Miller, Matthias & Hull LLP; Edward Lin

(57) ABSTRACT

A method (200) of balancing ultracapacitor cells (102) is provided. The method may measure individual ultracapacitor cell voltages, select a balancing setpoint voltage, compare an actual voltage variation within each ultracapacitor cell (102) with a voltage variation threshold, and enable a balancing element (104) associated with the ultracapacitor cell (102) if the actual voltage variation exceeds the voltage variation threshold.

11 Claims, 5 Drawing Sheets

METHOD FOR BALANCING ULTRACAPACITOR CELLS

TECHNICAL FIELD

The present disclosure relates generally to ultracapacitor cells, and more particularly, to systems and methods for passively balancing series-connected ultracapacitor cell arrangements.

BACKGROUND

Ultracapacitors are electrochemical cells which act as high energy density capacitors that are often used in energy storage devices. Due to their higher capacitance per size and mass, ultracapacitors occupy significantly less space than conventional electrolytic capacitors, and thus, are often preferred for compact and critical installations. In a typical application, several identical ultracapacitor cells are connected in series to provide a potential difference which sufficiently matches that required by the load. Ideally, each ultracapacitor cell of the series would behave identically with the adjacent cells. In reality, however, due to manufacturing inconsistencies, each ultracapacitor cell tends to behave differently over time, resulting in undesirable performance issues. For instance, each ultracapacitor cell can vary in capacitance and leakage current, leading to an uneven voltage distribution across the cells and inconsistent rates of discharge.

Such inconsistencies are typically countered by incorporating a balancing scheme or circuit configured to equalize the voltage of each cell within the series and improve the overall storage capacity. One of such schemes is an active balancing scheme. Active balancing schemes employ comparators or other active elements which aim to substantially equalize the voltage across the series-connected ultracapacitor cells. The nonlinear behavior of active balancing schemes reacts well to effectively balance and evenly distribute the voltage among series-connected ultracapacitor cells. However, there are some notable drawbacks to active balancing schemes. In some situations, for instance, active balancing schemes can be overly complex for the application at hand, and in all cases, active balancing schemes come at an overall higher cost of implementation.

Typical series-connected ultracapacitor cells alternatively use passive balancing schemes to equalize any voltage distributions. As compared with active balancing schemes, passive balancing schemes are much simpler in concept and in design, and employ passive circuit elements, such as resistors, to balance or distribute any uneven voltage distribution among the ultracapacitor cells. A typical passive balancing scheme for a set of series-connected ultracapacitor cells refers to a single, fixed balancing voltage or a fixed voltage variation in controlling the voltage distribution. Passive balancing schemes operate by bleeding off or discharging some of the electrical energy from higher voltage cells in order to balance the voltage of those cells with those of the lower voltage cells. However, in doing so, passive balancing schemes undesirably waste energy during the balancing process. Furthermore, current passive balancing schemes fail to take individual cell-to-cell capacitance variations into account.

Accordingly, there is a need for a more effective as well as a more simplified approach to balancing series-connected ultracapacitor cells. More specifically, there is a need for a balancing scheme that is not only less costly to implement, but also reduces the amount of electrical energy that is lost during the balancing process. Furthermore, there is a need for a balancing scheme which considers variations in capacitance or voltage in each individual ultracapacitor cell.

SUMMARY OF THE DISCLOSURE

In one aspect of the present disclosure, a method of balancing ultracapacitor cells is provided. The method may measure individual ultracapacitor cell voltages, select a balancing setpoint voltage, compare an actual voltage variation within each ultracapacitor cell with a voltage variation threshold, and enable a balancing element associated with the ultracapacitor cell if the actual voltage variation exceeds the voltage variation threshold.

In a refinement, the individual ultracapacitor cell voltages may be synchronously measured at near zero current conditions.

In another refinement, the measured cell voltages may range between a maximum cell voltage and a minimum cell voltage, where the balancing setpoint voltage may be selected to approximate the maximum cell voltage.

In another refinement, the voltage variation threshold may be a sum of an expected voltage variation and a predefined threshold voltage, where the expected voltage variation may be calculated based on an expected capacitance variation, the balancing setpoint voltage, and an average cell voltage.

In another refinement, the actual voltage variation may correspond to a difference between the measured cell voltage of one ultracapacitor cell and a minimum cell voltage.

In another refinement, the method may further disable the balancing element after a predefined duration of time.

In yet another refinement, the balancing element may include at least one resistor.

In another aspect of the present disclosure, a method of balancing ultracapacitor cells is provided. The method may monitor individual cell voltages of the ultracapacitor cells, select a balancing setpoint voltage based on the cell voltages, calculate an expected voltage variation based on an expected capacitance variation, the balancing setpoint voltage, and an average cell voltage, compare an actual voltage variation within each ultracapacitor cell with the expected voltage variation and a predefined threshold voltage, and enable a balancing resistor associated with the ultracapacitor cell if the actual voltage variation exceeds the allowed voltage variation.

In a refinement, the monitoring step may synchronously measure the individual ultracapacitor cell voltages at near zero current conditions.

In another refinement, the measured cell voltages may range between a maximum cell voltage and a minimum cell voltage, where the balancing setpoint voltage may be selected to approximate the maximum cell voltage.

In another refinement, the actual voltage variation may correspond to a difference between the measured cell voltage of one ultracapacitor cell and a minimum cell voltage.

In yet another refinement, the method may further disable the balancing resistor after a predefined duration of time.

In yet another aspect of the present disclosure, a control system for balancing ultracapacitor cells is provided. The control system may include a plurality of balancing elements and a controller. Each balancing element may be in selective communication with one of the ultracapacitor cells. The controller may be in communication with the balancing elements and the ultracapacitor cells. The controller may be configured to individually measure a cell voltage of each ultracapacitor cell, select a balancing setpoint voltage, compare an actual voltage variation within each ultracapacitor cell with a voltage variation threshold, and selectively enable the balancing elements corresponding to the identified ultracapacitor cells exhibiting actual voltage variations which exceed the voltage variation threshold.

In a refinement, the controller may measure the ultracapacitor cell voltages synchronously at near zero current conditions.

In another refinement, the measured cell voltages may range between a maximum cell voltage and a minimum cell voltage, and the controller may select the balancing setpoint voltage to approximate the maximum cell voltage.

In another refinement, the voltage variation threshold may be a sum of an expected voltage variation and a predefined threshold voltage. The controller may calculate the expected voltage variation based on an expected capacitance variation, the balancing setpoint voltage, and an average cell voltage.

In another refinement, the controller may determine the actual voltage variation based on a difference between the measured cell voltage of one ultracapacitor cell and a minimum cell voltage.

In another refinement, the controller may further be configured to disable the enabled balancing elements after a predefined duration of time.

In another refinement, the balancing elements and the controller may be adapted for use with series-connected ultracapacitor cells.

In yet another refinement, the balancing elements may include at least one resistor.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
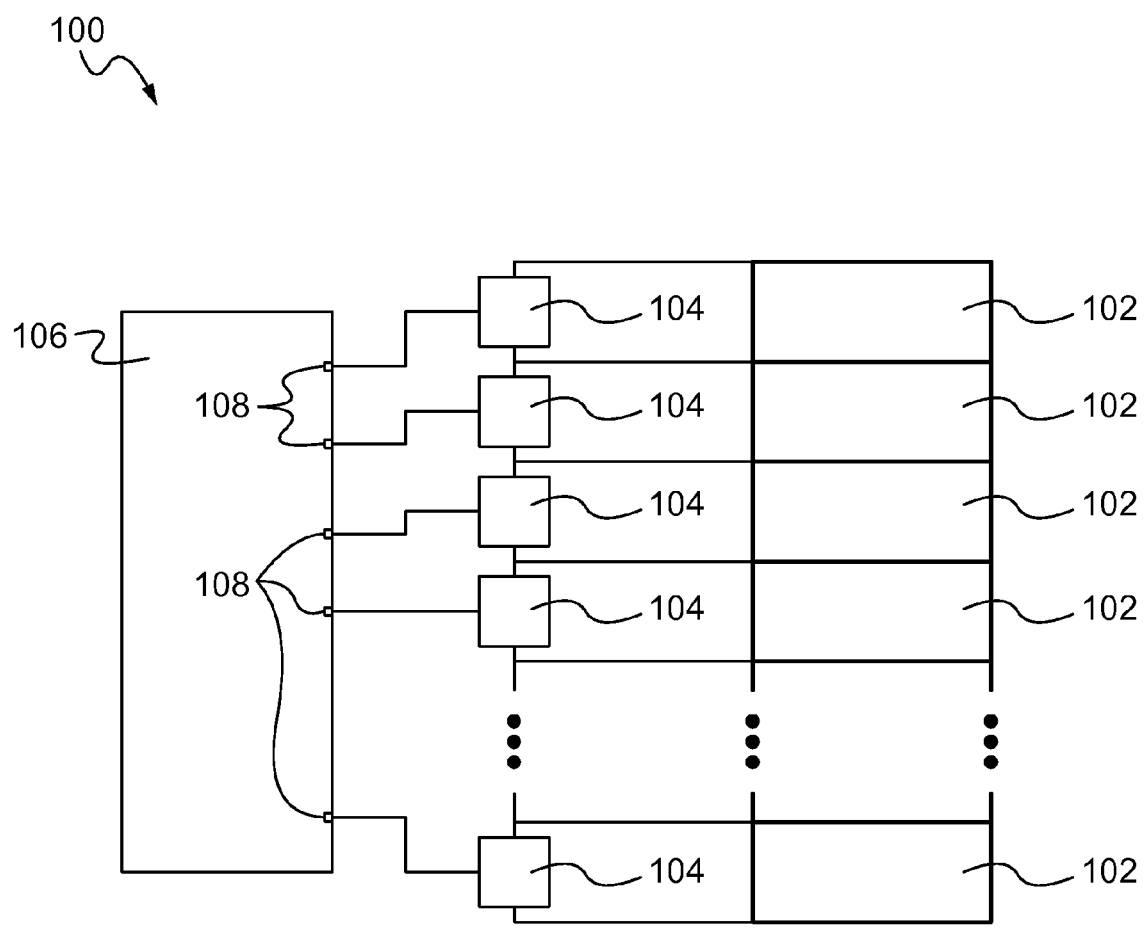
FIG. 1 is a schematic view of one exemplary control system for balancing ultracapacitor cells constructed in accordance with the teachings of the present disclosure.

FIG. 1 schematically illustrates one exemplary control system 100 that may be used in conjunction with a plurality of ultracapacitor cells 102. As shown, the ultracapacitor cells 102 may be electrically coupled together in a series configuration. While the ultracapacitor cells 102 may have been manufactured to be substantially identical to one another, the electrical properties and/or characteristics exhibited by each cell 102 may slightly vary. Correspondingly, the control system 100 may be provided and configured to balance any such variations which may exist among the given ultracapacitor cells 102. More specifically, the control system 100 may include a plurality of balancing elements 104 and a controller 106. Each balancing element 104 may correspond to one of the ultracapacitor cells 102 and be electrically coupled substantially in parallel thereto. The balancing elements 104 may include a passive element, such as a resistor or any other element suited to passively dissipate current therethrough. Balancing resistors 104 may be appropriately sized relative to the rated leakage of each ultracapacitor cell 102 so as to dissipate power at a desired rate. Furthermore, the controller 106 may be in communication with each of the individual balancing elements 104 through which the controller 106 may monitor and balance the cell voltages of the ultracapacitor cells 102. The controller 106 may be implemented using one or more of a microcontroller, a processor, a microprocessor, a field programmable gate array (FPGA), or any other suitable circuit device capable of executing an algorithm or a preprogrammed series of steps.

Still referring to FIG. 1, the controller 106 may include a plurality of communication ports 108 through which it may electrically communicate with each of the ultracapacitor cells 102 through the corresponding balancing elements 104. One or more of the communication ports 108 may be designated as inputs configured to measure cell voltage or any other relevant information pertaining to the electrical state of each individual ultracapacitor cell 102. For instance, through these inputs, the controller 106 may receive information pertaining to the current through and/or the voltage across its corresponding balancing element 104, and thus, the cell voltage of the associated ultracapacitor cell 102. One or more of the communication ports 108 may also be designated as outputs configured to selectively engage the balancing elements 104. For example, the communication ports 108 may transmit electrical signals that are generated within the controller 106 and adapted to selectively engage or disengage any one or more of the balancing elements 104 during operation.

Figure 2:
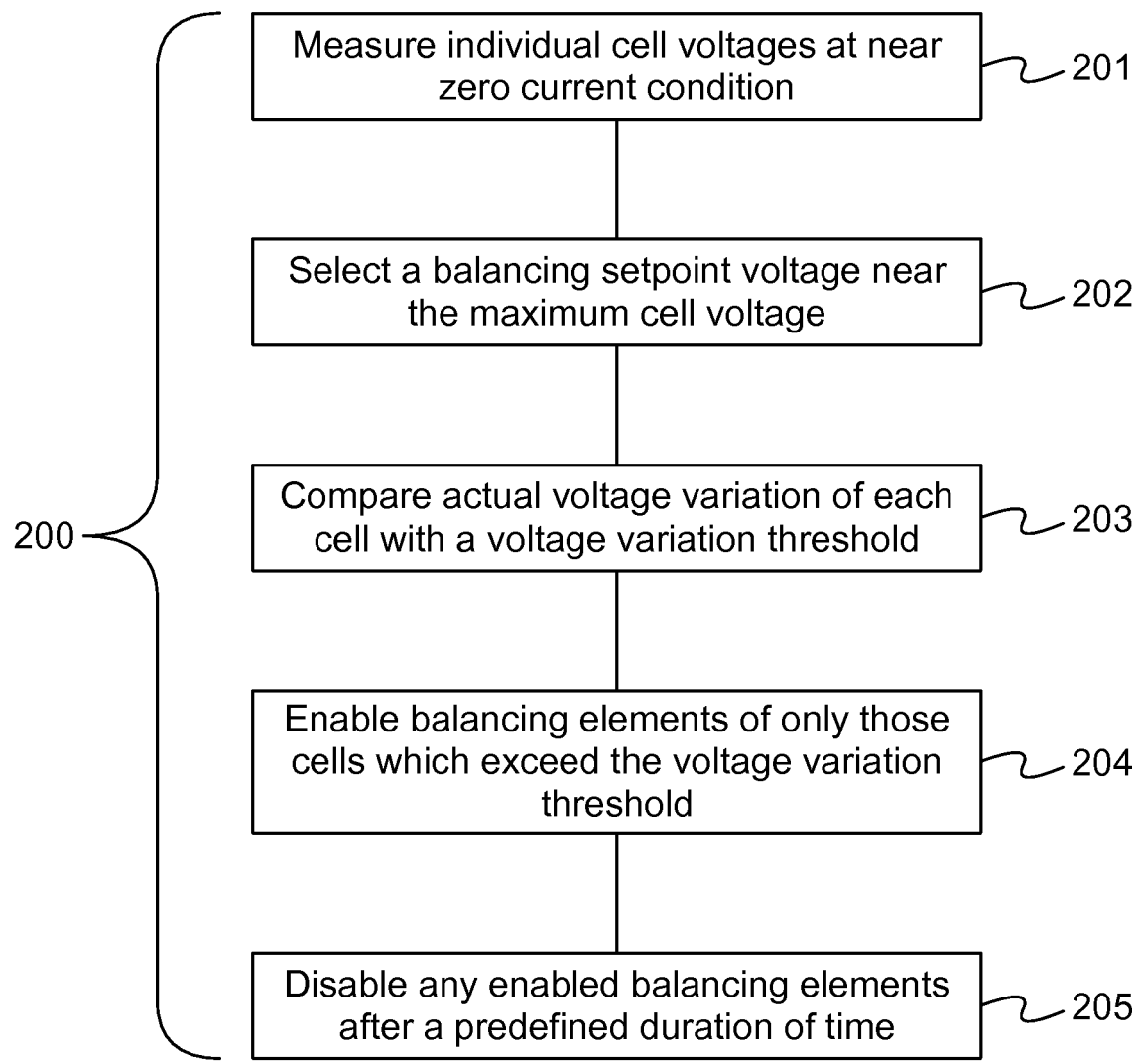
FIG. 2 is diagrammatic view of one exemplary method of balancing ultracapacitor cells.

Turning now to FIG. 2, one exemplary algorithm or method 200 by which the controller 106 may be configured to operate is provided. The method 200 may be stored within a memory that is accessible to the controller 106 and disposed either on-board the controller 106 or provided separately. Moreover, the method 200 may configure the controller 106 to function according to, for example, steps 201-205 shown in FIG. 2. As an initial step 201, the controller 106 may be configured to monitor or measure the cell voltage in each individual ultracapacitor cell 102. In particular, the controller 106 may measure the current through or the voltage across the balancing element 104 of each cell once the current associated therewith has been determined to be null or negligible. In further modifications, the controller 106 may be configured to perform step 201 synchronously, or during the execution of any one or more of the steps 202-205, for example.

In step 202, a balancing setpoint voltage may be designated with a voltage value which approximates the rated maximum voltage of the ultracapacitor cells 102. For example, the controller 106 may be preprogrammed with a fixed balancing setpoint voltage that is selected based on known specifications, such as manufacturer specifications, of the ultracapacitor cells 102. By selecting a relatively high balancing setpoint voltage, and because the balancing setpoint voltage is selected based at least partially on characteristics of the specific ultracapacitor cells 102 in use, the controller 106 may be able to further minimize any excess energy that may be wasted through bleeding.

Figure 3:
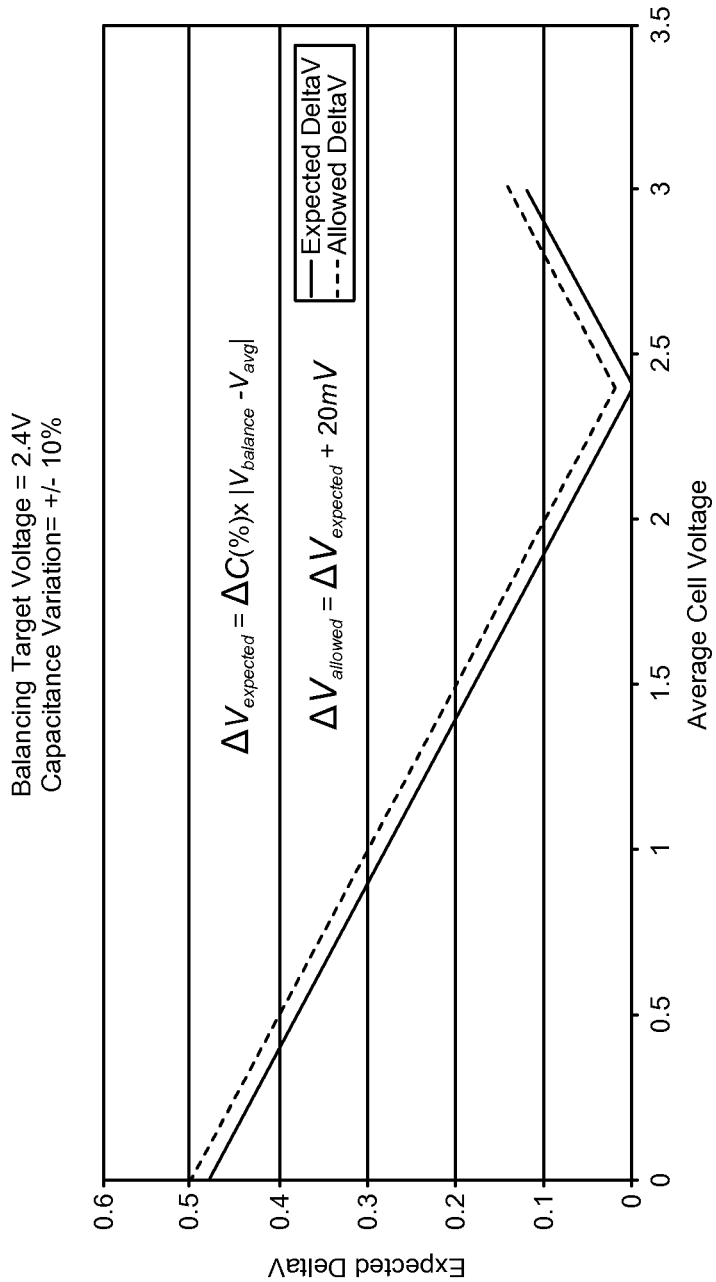
FIG. 3 is a graphical view of the expected voltage variation and the allowed voltage variation as computed using one exemplary implementation of the method of FIG. 2.

As shown in FIG. 2, once a fixed balancing setpoint has been established and stored in a memory accessible to the controller 106, the controller 106 may be configured to compare actual voltage variations with a voltage variation threshold in step 203. Actual voltage variations may correspond to the variations in cell voltage individually measured or detected by the controller 106 in each of the ultracapacitor cells 102. The voltage variation threshold may correspond to limits which may be defined within the controller 106 during operation. The controller 106 may calculate the voltage variation threshold based on the sum of an expected voltage variation and a predefined threshold voltage. More specifically, the controller 106 may calculate the voltage variation threshold using, for example, $$\Delta V_{thr} = \Delta V_{exp} + V \quad (1),$$

where $\Delta V_{thr}$ is the allowed voltage variation or the voltage variation threshold, $\Delta V_{exp}$ is the expected voltage variation and V is the predefined threshold voltage. The value of the threshold voltage may be a fixed voltage value, for instance, in terms of millivolts (mV), which may be user-selectable and preprogrammed into a memory associated with the controller 106. The expected voltage variation may be calculated based on an average cell voltage determined from the measurements of step 201, the balancing setpoint voltage selected in step 202 and an expected capacitance variation of the ultracapacitor cells 102. More specifically, the expected voltage variation may be determined by $$\Delta V_{exp} = \Delta C(\%) \times |V_{bal} - V_{avg}| \quad (2),$$

where $\Delta V_{exp}$ is the expected voltage variation, $\Delta C$ is the expected capacitance variation in percentage form, $V_{bal}$ is the balancing setpoint voltage and $V_{avg}$ is the average cell voltage. The corresponding relationship between the expected voltage variation and the voltage variation threshold, or the allowed variation threshold, may be graphically represented, as shown for example in FIG. 3, where the balancing target voltage is approximately 2.4 V, the capacitance variation is approximately 10%, and the predefined threshold voltage is approximately 20 mV. Once the controller 106 defines the voltage variation threshold, the controller 106 may compare actual voltage variations within the individual ultracapacitor cells 102 to determine if any balancing is required.

Based on the comparisons in step 203, the controller 106 may be configured to balance any one or more of the ultracapacitor cells 102 in step 204. More specifically, if the actual voltage variation observed in an ultracapacitor cell 102 exceeds the voltage variation threshold, the controller 106 may selectively enable the balancing element 104 associated with the unbalanced cell 102 so as to initiate the balancing process. The controller 106 may individually enable the balancing elements 104 using any one or more of a switch, a relay, a gate, or any other means of initiating dissipation of electrical power therethrough. Alternatively, if the controller 106 determines that the actual voltage variation observed in an ultracapacitor cell 102 is less than the voltage variation threshold and within acceptable limits, the controller 106 may be configured to proceed with no further action with respect to that particular ultracapacitor cell 102 and instead continue monitoring cell voltages.

Once the balancing process has been initiated, the controller 106 in step 205 may be configured to automatically disable any of the balancing elements 104 enabled during step 204 after a predefined duration of time. The duration of the wait time may be selected and preprogrammed into the controller 106 based on the specifications of the ultracapacitor cells 102 and the balancing elements 104, and the time required to sufficiently balance the ultracapacitor cells 102. Moreover, the controller 106 may be configured to disable balancing elements 104 individually and/or at different times. In alternative modifications, the controller 106 may also be configured to continue monitoring the cell voltages of unbalanced ultracapacitor cells 102, and disable the enabled balancing elements 104 once the cell voltages have returned within acceptable limits.

Figure 4:
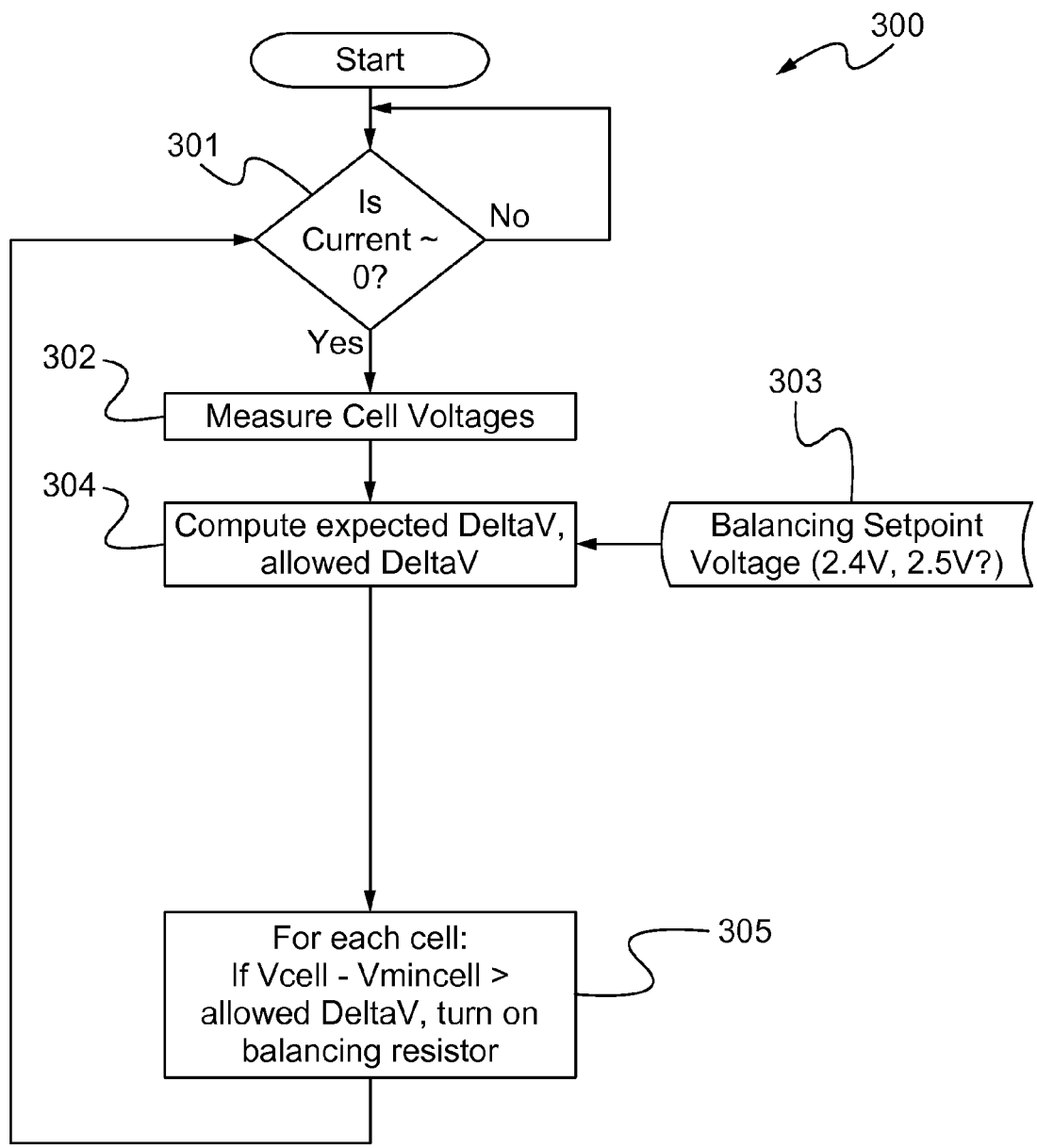
FIG. 4 is a diagrammatic view of another implementation of the method of FIG. 2.

Referring now to FIG. 4, a flow diagram 300 of one exemplary application of the method 200 is provided. In conjunction with the method 200 of FIG. 2, the controller 106 may initially monitor and determine if a near zero current condition is present in state 301. If there is a notable amount of current, the controller 106 may loop back into state 301 and continue monitoring the current level. However, if the observed current is negligible or near zero, the controller 106 may proceed to state 302 and begin measuring the cell voltages. In accordance with state 303, the controller 106 may be preprogrammed or set to define a balancing setpoint voltage, which may be determined based on manufacturer specifications associated with the ultracapacitor cells 102, or the like. In state 304, the controller 106 may further compute the expected voltage variation as well as the allowed voltage variation, or the voltage variation threshold. More specifically, the expected voltage variation and the voltage variation threshold values may be calculated based at least partially on the cell voltages observed in state 302, the balancing setpoint voltage defined in state 303, as well as the expected capacitance variation of the ultracapacitor cells 102.

Once all of the required values have been obtained, the controller 106 in state 305 may compare the actual voltage variation observed in state 302 with the voltage variation threshold obtained in state 304 for each individual ultracapacitor cell 102. For example, the controller 106 may compute the difference between the measured cell voltage and the minimum cell voltage, and determine if that difference exceeds the voltage variation threshold. If the voltage variation threshold is exceeded, the controller 106 may turn on the balancing element or resistor 104. If the voltage variation is within acceptable limits, the controller 106 may proceed with no further action. After the voltage variation has been verified for each individual ultracapacitor cell 102, the controller 106 may be configured to automatically return to state 301 to detect for the next near zero current condition.

Figure 5:
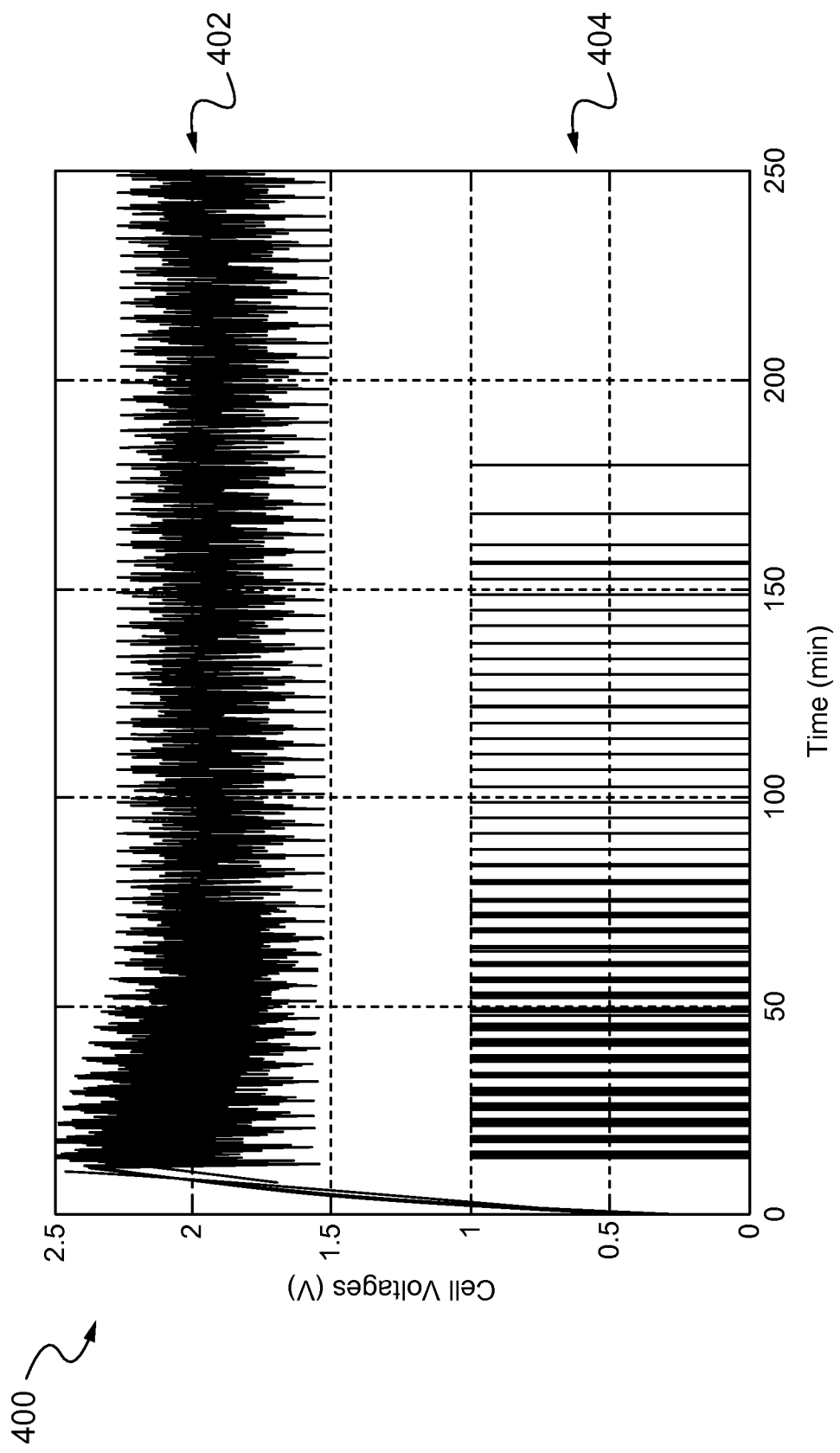
FIG. 5 is a combined graphical view of the cell voltages of series-connected ultracapacitor cells and the associated balancing flags simulated using yet another implementation of the method of FIG. 2.

Turning to FIG. 5, one exemplary simulation 400 of the method 200 is provided as performed according to the flow diagram 300 of FIG. 4. More specifically, the first set of waveforms 402 may indicate the individual cell voltages of the ultracapacitor cells 102, while the second signal set 404 may indicate ultracapacitor cells 102 that are flagged for balancing, or balancing events. As indicated by waveforms 402, the voltage in each cell may vary over time and exhibit a voltage spread which may be caused by variations in capacitance between the series-connected ultracapacitor cells 102. Moreover, the voltage spread may be minimal during the initial charge from 0 V, but may become more prominent as the voltages of the ultracapacitor cells 102 approach the maximum cell voltage, which in the particular iteration shown is approximately 2.5 V.

Once variations are observed to exceed acceptable limits, the associated controller 106 may be configured to individually enable the balancing elements or resistors 104 corresponding to the unbalanced ultracapacitor cells 102, as indicated by the balancing flags signals 404 of FIG. 5. As shown, each successive balancing event may effectively aid in balancing the voltage spread across the ultracapacitor cells 102, and thus, progressively reduce the need for balancing. At the outset and after the initial charge where cell voltage variations are more prominent, for instance, several of the ultracapacitor cells 102 may be more frequently flagged for balancing. However, the frequency of the balancing events as well as the number of ultracapacitor cells 102 that are flagged per event may be substantially reduced over time as the voltage spread diminishes and as the ultracapacitor cells 102 become more balanced, as shown for example after approximately 180 minutes in the simulated plot 400 of FIG. 5.

INDUSTRIAL APPLICABILITY

In general, the foregoing disclosure finds utility in various industrial applications, such as the farming, construction and mining industries, in improving upon existing energy storage devices and providing for more efficient transitions between different modes of operation typically associated with work vehicles and/or machines, such as tractors, backhoe loaders, compactors, feller bunchers, forest machines, industrial loaders, skid steer loaders, wheel loaders, and the like. More specifically, the disclosed control systems and methods may be implemented with series-connected arrangements of ultracapacitor cells or other electrochemical capacitors commonly used in the art. The systems and methods disclosed herein provide a more effective as well as a more simplified approach to balancing series-connected ultracapacitor cells. Moreover, by providing a passive balancing solution that is capable of synchronously monitoring and controlling individual ultracapacitor cells, the present disclosure provides not only a less costly balancing solution, but also a balancing solution which substantially reduces the amount of electrical energy that is lost during the balancing process.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of balancing ultracapacitor cells, comprising the steps of:
   measuring individual ultracapacitor cell voltages;
   selecting a balancing setpoint voltage;
   comparing an actual voltage variation within each ultracapacitor cell with a voltage variation threshold, wherein the voltage variation threshold is a sum of an expected voltage variation and a predefined threshold voltage, the expected voltage variation being calculated based on an expected capacitance variation, the balancing setpoint voltage, and an average cell voltage; and
   enabling a balancing element associated with the ultracapacitor cell if the actual voltage variation exceeds the voltage variation threshold.

2. The method of claim 1, wherein the individual ultracapacitor cell voltages are synchronously measured at near zero current conditions.

3. The method of claim 1, wherein the balancing setpoint voltage is selected to approximate the maximum rated voltage of the ultracapacitor cell.

4. The method of claim 1, wherein the actual voltage variation corresponds to a difference between the measured cell voltage of one ultracapacitor cell and a minimum cell voltage.

5. The method of claim 1, further comprising the step of disabling the balancing element after a predefined duration of time.

6. The method of claim 1, wherein the balancing element includes at least one resistor.

7. A method of balancing ultracapacitor cells, comprising the steps of:
   monitoring individual cell voltages of the ultracapacitor cells;
   selecting a balancing setpoint voltage;
   calculating an expected voltage variation based on an expected capacitance variation, the balancing setpoint voltage, and an average cell voltage;
   comparing an actual voltage variation within each ultracapacitor cell with the expected voltage variation and a predefined threshold voltage; and
   enabling a balancing resistor associated with the ultracapacitor cell if the actual voltage variation exceeds the allowed voltage variation.

8. The method of claim 7, wherein during the step of monitoring, the individual ultracapacitor cell voltages are synchronously measured at near zero current conditions.

9. The method of claim 7, wherein the balancing setpoint voltage is selected to approximate the maximum rated voltage of the ultracapacitor cell.

10. The method of claim 7, wherein the actual voltage variation corresponds to a difference between the measured cell voltage of one ultracapacitor cell and a minimum cell voltage.

11. The method of claim 7, further comprising the step of disabling the balancing resistor after a predefined duration of time.

* * * * *